US 8,997,235 B2

United States Patent
De Barros et al.

(10) Patent No.: US 8,997,235 B2
(45) Date of Patent: Mar. 31, 2015

(54) ADAPTIVE FUZZING SYSTEM FOR WEB SERVICES

(75) Inventors: Marcelo De Barros, Redmond, WA (US); Michael Andrews, Redmond, WA (US); Manish Mittal, Redmond, WA (US); Girish Bablani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 546 days.

(21) Appl. No.: 13/367,381

(22) Filed: Feb. 7, 2012

(65) Prior Publication Data

US 2013/0205397 A1 Aug. 8, 2013

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| G06F 21/57 | (2013.01) |

(52) U.S. Cl.
CPC .......... H04L 63/1433 (2013.01); G06F 21/577 (2013.01)
USPC ........................................................ 726/25

(58) Field of Classification Search
CPC .............. H04L 63/1433; G06F 21/577; G06F 2221/033; G06F 11/36; G06F 11/3604
USPC ................................................... 726/22–25
See application file for complete search history.

(56) References Cited

U.S. PATENT DOCUMENTS

| 7,975,273 | B2 | 7/2011 | Yang et al. | |
| 8,087,088 | B1 * | 12/2011 | Pennington et al. | 726/25 |
| 8,505,094 | B1 * | 8/2013 | Xuewen et al. | 726/22 |
| 2002/0010855 | A1 * | 1/2002 | Reshef et al. | 713/164 |
| 2004/0059809 | A1 * | 3/2004 | Benedikt et al. | 709/224 |

(Continued)

FOREIGN PATENT DOCUMENTS

EP    2271047 A1    1/2011

OTHER PUBLICATIONS

Rune Hammersland, Finding weaknesses in web applications through the means of fuzzing, 2008.*

(Continued)

*Primary Examiner* — Shewaye Gelagay
*Assistant Examiner* — Trong Nguyen
(74) *Attorney, Agent, or Firm* — Brian Haslam; Mike Allen; Micky Minhas

(57) ABSTRACT

Web applications, systems and services, which are prone to cyber-attacks, can utilize an adaptive fuzzing system and methodology to intelligently employ fuzzer technology to test web site pages for vulnerabilities. A breadth first search and minimal fuzzing testing is performed on identified pages of a web site looking for either a vulnerability or the potential for a vulnerability. Heuristics are gathered and/or generated on each tested web page to determine a vulnerability score for the page that is an indication of the page's potential for hosting a vulnerability. When a page is discovered with a vulnerability score that indicates the page has the potential for a vulnerability a depth first search and expanded fuzzing testing is performed on one or more branches of the web site that begin with the page with the potential vulnerability.

14 Claims, 8 Drawing Sheets

(56) References Cited

U.S. PATENT DOCUMENTS

| | | |
|---|---|---|
| 2005/0251863 A1* | 11/2005 | Sima .............................. 726/25 |
| 2008/0256340 A1* | 10/2008 | Conger et al. ................ 712/217 |
| 2008/0320328 A1 | 12/2008 | O'Leary |
| 2009/0119777 A1* | 5/2009 | Jeon ............................... 726/25 |

OTHER PUBLICATIONS

"JBroFuzz", Retrieved at <<https://www.owasp.org/index.php/JBroFuzz>>, Retrieved Date: Nov. 1, 2011, p. 1.

"DEFENSICS ™ Universal Fuzzer", Retrieved at <<http://www.codenomicon.com/defensics/universal-fuzzer>>, Retrieved Date: Nov. 1, 2011, pp. 2.

"WSFuzzer—Web Services Fuzzing Tool for HTTP and SOAP", Retrieved at <<http://www.darknet.org.uk/2008/03/wsfuzzer-web-services-fuzzing-tool-for-http-and-soap/>>, Retrieved Date: Nov. 1, 2011, pp. 6.

Faust Sacha, "Web Application Testing with SPI Fuzzer", Retrieved at <<http://www.rmccurdy.com/scripts/docs/spidynamics/SPIFuzzer.pdf>>, 2005, pp. 1-2.

* cited by examiner

ADAPTIVE FUZZING SYSTEM FOR WEB SERVICES

BACKGROUND

Internet, i.e., web, applications, systems and services are increasingly becoming prone to cyber-attacks which cost business institutions in downtime, repairs, monitoring and general public relations, and can, in instances, have a crippling effect on a business' ability to effectively operate via the internet.

Many cyber-attacks begin with hackers utilizing fuzzers, i.e., fuzzing, to search for vulnerabilities in a web-based system, i.e., internet, or web, site. Fuzzers use a technique, often automated or semi-automated, that involves providing invalid, unexpected and/or random data to the inputs of one or more pages of a web site. Known fuzzer technologies work by randomly scanning a web site being attacked attempting to uncover vulnerabilities in a web site page that can be exploited to crash the web site or commandeer the site for the attackers' own purposes.

Fuzzing technologies can also, therefore, be utilized by business institutions to test their web sites for vulnerabilities in order to find and correct existing issues before a cyber attacker has a chance to discover and exploit them. However, due to the random nature of known fuzzer technologies it often takes a considerable amount of time for these techniques to be used to legitimately discover vulnerabilities on a web site, if they can uncover any at all.

Thus it is desirable to adapt fuzzing technologies to intelligently traverse a web site and identify web pages on a site that have or may have vulnerabilities. It is further desirable to utilize fuzzing technologies in an expedient manner in order to assist in minimizing the time these fuzzers require for discovering vulnerabilities on a web site. It is also advantageous to utilize historical fuzzing test results for a web site to ensure the web site is adequately checked for issues that may exist but have as yet to be identified.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodologies for intelligently employing adaptive fuzzing testing to pages of a web site to efficiently test the web site for vulnerabilities.

In embodiments a breadth first search is employed to identify pages of a web site to perform minimal adaptive fuzzing testing on. In embodiments when a web site page is identified as potentially hosting a vulnerability expanded fuzzing testing is performed on the identified web page to attempt to uncover any vulnerabilities on the page. In embodiments when a web site page is identified as potentially hosting a vulnerability a depth first search is then employed to identify additional pages of the web site to continue to perform expanded fuzzing testing on to attempt to uncover vulnerabilities within the web site.

In embodiments heuristics are gathered and/or generated for web pages of a web site. In embodiments one or more heuristic values for a web page are utilized to generate a vulnerability score for the web page. In embodiments if a web page's vulnerability score is at least as great as a predetermined vulnerability threshold value the web page is identified as potentially hosting a vulnerability.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
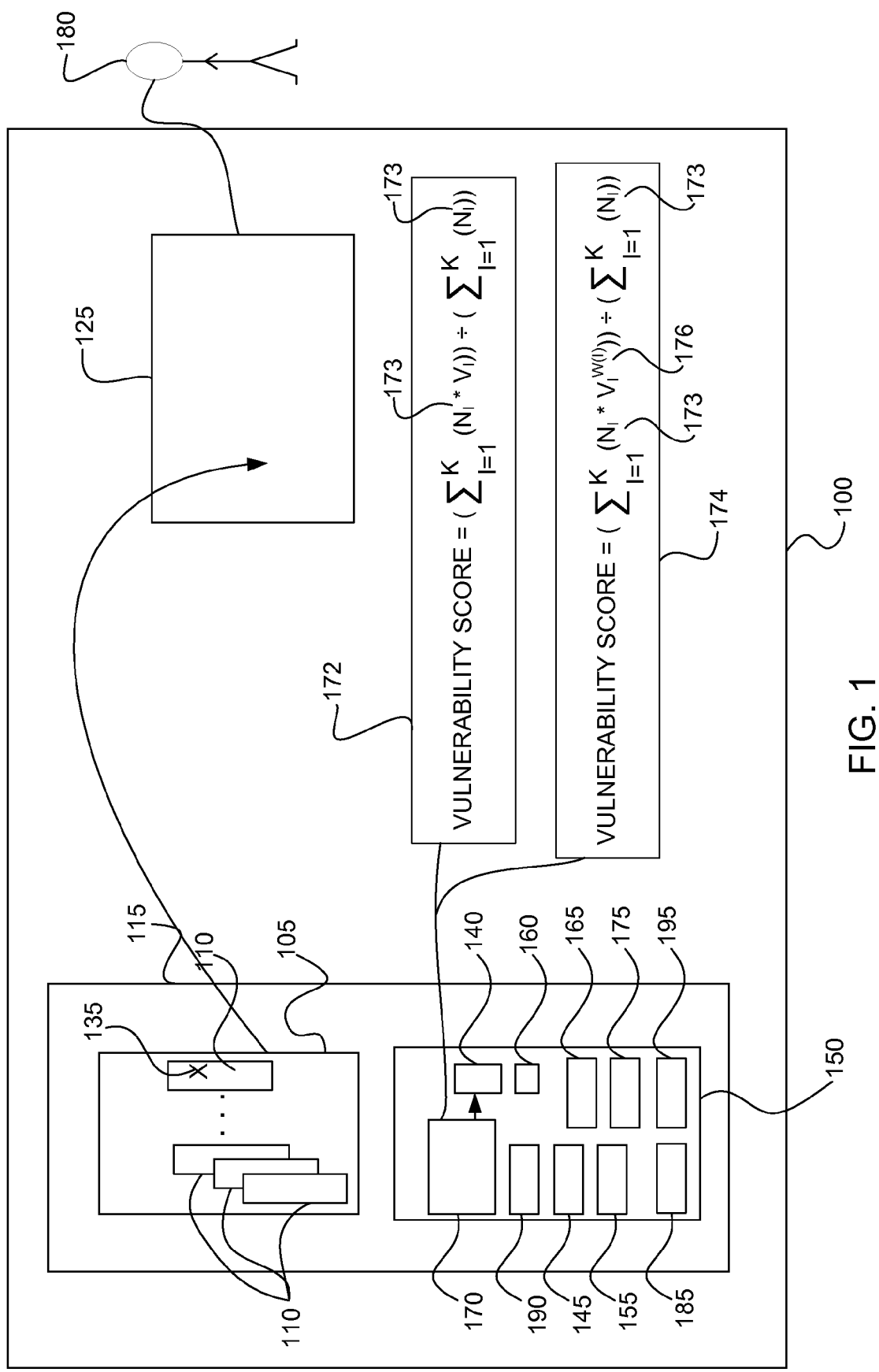
FIG. 1 depicts an exemplary client/server environment hosting an embodiment fuzzing system with the capability to examine web sites for vulnerabilities.

FIG. 1 depicts an exemplary client/server environment 100 hosting an embodiment adaptive fuzzing system 150 with the capability to examine web sites 105 for vulnerabilities 135. In an embodiment a vulnerability 135 can be an error on a web page 110 of a web site 105 and/or an issue, e.g., a privacy issue, etc., with a web page 110 that may be able to be exploited via a cyber-attack. As is commonly known, a web site 105 can feature one or more web pages 110 which can be output, i.e., displayed, to a user 180 via their client computing device 125.

In an embodiment user(s) 180 can utilize an adaptive fuzzing system 150 hosted on a client computing device 125, also referred to herein as a client 125, to check, or otherwise test, one or more web pages 110 of one or more web sites 105 for vulnerabilities 135. In another embodiment user(s) 180 can utilize an adaptive fuzzing system 150 hosted on a server computing device 115, also referred to herein as a server 115, and accessible via their client 125 to check one or more web pages 110 of one or more web sites 105 for vulnerabilities 135.

Figure 2:
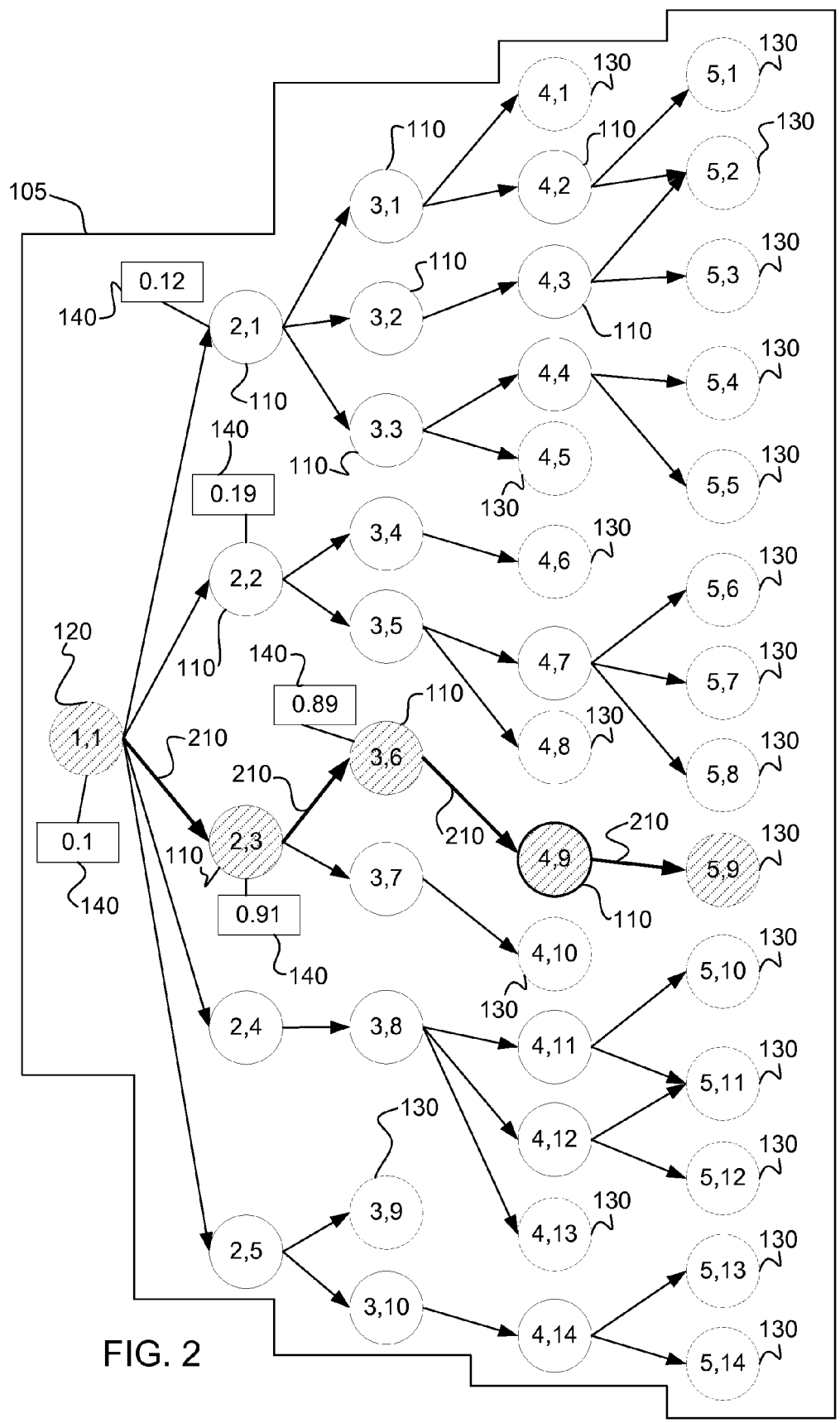
FIG. 2 depicts an exemplary web site on which an embodiment fuzzing system can be utilized to check the web site's pages for vulnerabilities.

FIG. 2 depicts an exemplary web site 105 on which an embodiment adaptive fuzzing system 150 can be utilized to check, or otherwise test, the web pages 110 of the web site 105 for vulnerabilities 135. As can be seen from the rudimentary exemplary web site 105, web sites 105 can be complicated with a multitude of web pages 110 being referenced, i.e., called, or otherwise accessible, from other web site web pages 110. Thus, with many common web sites 105 it can be difficult to effectively and/or efficiently discover web page vulnerabilities 135 utilizing known fuzzing technologies that currently rely on happenstance to identify any web page 110 of a web site 105 with a vulnerability 135 or potential vulnerability 135.

As previously noted, common current cyber-attacks can utilize fuzzers, i.e., fuzzing, to randomly search for vulnerabilities 135 in a web-based system, i.e., internet 670, or web, site 105. Fuzzers use a technique, often automated or semi-automated, that involves providing invalid, unexpected and/or random data to the inputs of one or more pages 110 of a web site 105. Known fuzzer technologies work by randomly scanning a web site 105 being attacked attempting to uncover vulnerabilities in a web page 110. Due to the randomness of the current fuzzers, however, it can take a very long time, and a certain amount of luck, for a known fuzzer to uncover any vulnerability 135 in a web page 110. Thus, utilizing current fuzzing technology to attempt to test a web site 105 for vulnerabilities 135 in order to find and correct existing issues before a cyber-attacker has a chance to discover and exploit them can take a considerable amount of time and also rely on some luck.

An embodiment exemplary web site 105 has at least one web page 110, also referred to herein as a page, or node, 110. As noted, often embodiment web sites 105 contain many web pages 110 that can be traversed by a user 180.

In an exemplary embodiment web site 105 one web page 110, i.e., a child web page 110, can be referenced by one or more other web pages 110, i.e., parent web pages 110. In an embodiment a branch 210 of an embodiment web site 105 is made up of a group of two or more nodes 110 of the web site 105 that reference one another from a web site start node, e.g., web site entry web page (1,1) 120, to a second, end, node 130, web page (5,9) 130. In exemplary embodiment web site 105 of FIG. 2 the bolded branch 210 includes the start node (1,1) 120, nodes 110 (2,3), (3,6) and (4,9), and end node (5,9) 130.

In an embodiment a web site start node 120, also referred to herein as a start node 120, e.g., node (1,1) 120, is a top-level, i.e., first, or entry, node 110 for a web site 105. In an embodiment an end node 130, e.g., node (5,9) 130, is a bottom-level, i.e., final or last, node 110 in a branch 210 for a web site 105. Other exemplary end nodes 130 for the web site 105 of FIG. 2 are nodes (3,9), (4,1), (4,5), (4,6), (4,8), (4,10), (4,13), (5,1), (5,2), (5,3), (5,4), (5,5), (5,6), (5,7), (5,8), (5,10), (5,11), (5,12), (5,13) and (5,14).

In an embodiment various nodes 110 of a web site 105 are identified as being positioned at differing levels. In the exemplary web site 105 of FIG. 2 there are five (5) web page levels. In an embodiment the level that a web page 110 is identified as being at is determined by the minimum number of pages 110 of the web site 105 that are accessed, e.g., by a user 180, prior to the web page 110 being accessed, starting from a start node 120, e.g., node (1,1) 120.

For example, node (1,1) 120 is at the first (1) level of the exemplary web site 105 of FIG. 2 as it is the first, start, node 120 that is accessed by a user 180 upon the user 180 accessing the web site 105. As another example, nodes 110 (2,1), (2,2), (2,3), (2,4) and (2,5) are all at the second (2) level of the exemplary web site 105 of FIG. 2 as each of these nodes 110 can be accessed by a minimum of two (2) web site nodes 110, i.e. the start node (1,0) 120 and then either node (2, 1) 110, node (2,2) 110, node (2,4) 110 or node (2,5) 110.

Likewise, nodes 110 (3,1), (3,2), (3,3), (3,4), (3,5), (3,6), (3,7), (3,8), (3,9) and (3,10) are all at the third (3) level of the exemplary web site 105 of FIG. 2 as each of these nodes 110 can be accessed by a minimum of three (3) web site nodes 110. For example node (3,1) 110 can be accessed by the start node (1,1) 120, then node (2,1) 110 and finally node (3,1) 110. Similarly, node (3,2) 110 can be accessed by the start node (1,1) 120, then node (2,1) 110 and finally node (3,2) 110. Too, node (3,3) 110 can be accessed by the start node (1,1) 120, then node (2,1) 110 and finally node (3,3) 110. Third level nodes 110 (3,4) and (3,5) can be accessed via the start node (1,1) 120, node (2,2) 110 and finally, respectively node (3,4) 110 or node (3,5) 110.

In exemplary web site 105 of FIG. 2 nodes 110 (4,1), (4,2), (4,3), (4,4), (4,5), (4,6), (4,7), (4,8), (4,9), (4,10), (4,11), (4,12), (4,13) and (4,14) are all at the fourth (4) level as each of these nodes 110 can be accessed by a minimum of four (4) web site nodes 110. For example node (4,1) 110 can be accessed by the start node (1,1) 120, then node (2,1) 110, then node (3,1) 110 and finally node (4,1) 110.

In exemplary web site 105 of FIG. 2 nodes 110 (5,1), (5,2), (5,3), (5,4), (5,5), (5,6), (5,7), (5,8), (5,9), (5,10), (5,11), (5,12), (5,13) and (5,14) are all at the fifth (5) level as each of these nodes 110 can be accessed by a minimum of five (5) web site nodes 110.

In an alternative embodiment the level that a web page 110 is identified to be at is determined by other criteria, e.g., the maximum number of pages 110 of the web site 105 that can be accessed, e.g., by a user 180, prior to the web page 110 being accessed, starting from a start node 120, e.g., node (1,1) 120, etc.

As can be seen from the exemplary web site 105 of FIG. 2 an end node 130 does not have to be at the lowest level of the web site 105. For example, node (3,9) is an end node 130 yet it is at the third level rather than the fifth level of the web site 105.

Figure 3:
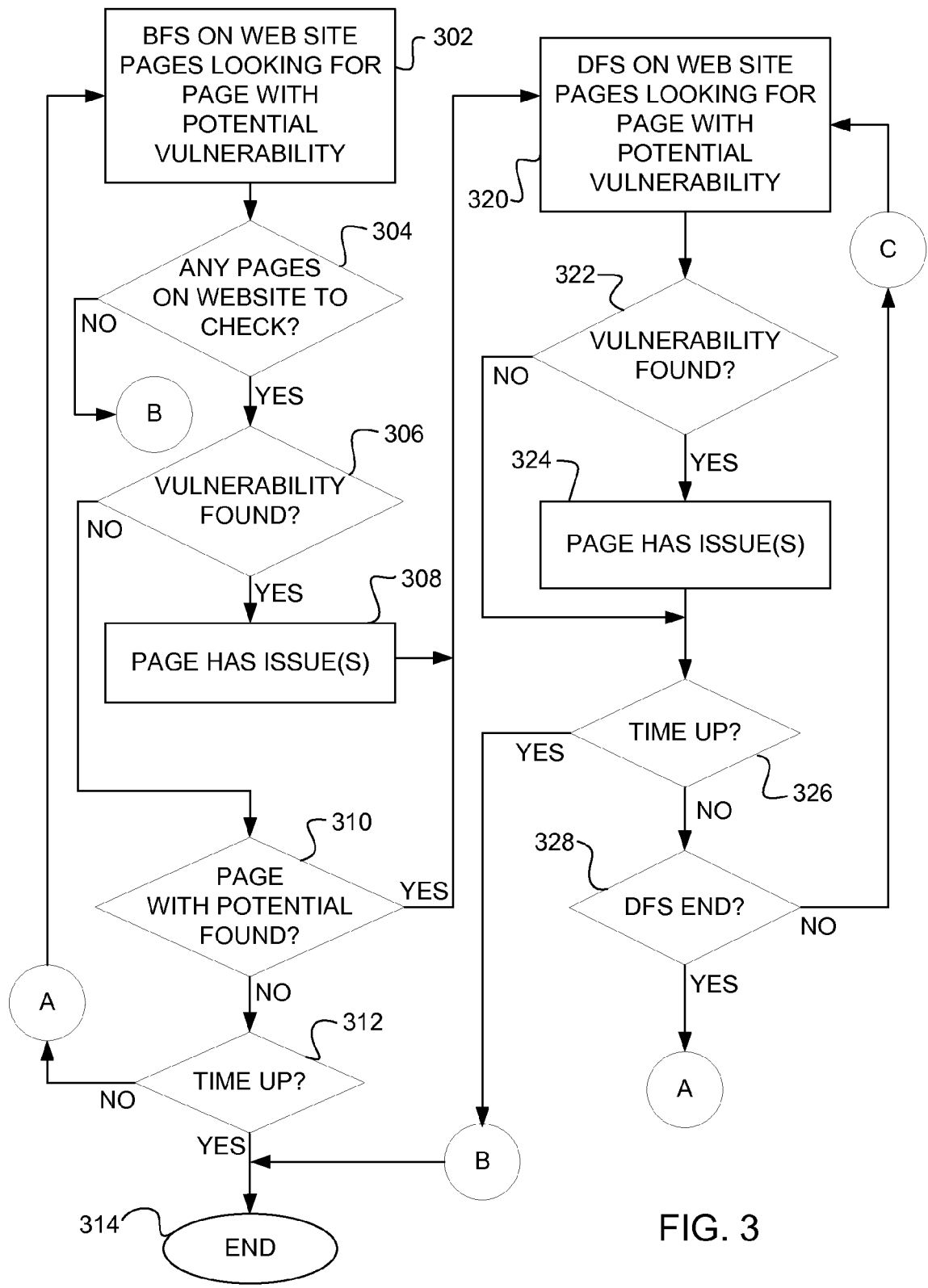
FIG. 3 illustrates an embodiment overview logic flow for an embodiment fuzzing system to be utilized on a web site.

FIG. 3 illustrates an embodiment overview logic flow for an embodiment adaptive fuzzing system 150 to be utilized on web sites 105. While the following discussion is made with respect to systems portrayed herein the operations described may be implemented in other systems. The operations described herein are not limited to the order shown. Additionally, in other alternative embodiments more or fewer operations may be performed.

Referring to FIG. 3 in an embodiment a breadth first search (BFS) is utilized first to determine the pages of a web site to test, or otherwise check, for vulnerabilities 302. In an embodiment a breadth first search tests the nodes 110 of a web site 105 at any particular level first. Thus, for example, in this embodiment in a breadth first search of the exemplary web site 105 of FIG. 2 the adaptive fuzzing system 150 tests nodes 110 at the first (1) level first, i.e., node (1,1) 120 is tested first. In the breadth first search of the web site 105 of FIG. 2 of this embodiment the adaptive fuzzing system 150 tests nodes 110 at the second (2) level second, i.e., nodes 110 (2,1), (2,2), (2,3), (2,4) and (2,5), and so on.

In an embodiment at decision block 304 a determination is made as to whether there are any pages of the web site left to check; i.e., a determination is made as to whether or not all the pages of the current web site have already been tested by the adaptive fuzzing system. In an aspect of this embodiment at decision block 304 a determination is made as to whether or not all the pages of the current web site have already been tested by the adaptive fuzzing system in the current testing session. If there are no more pages left to test at this time in an embodiment the adaptive fuzzing on the web site is terminated 314.

If however there are still web pages on the web site to be checked by the adaptive fuzzing system then in an embodiment minimum, also referred to herein as light, fuzzing is performed on a current web page under test and a determination is made as to whether the minimum fuzzing has uncovered a vulnerability on the page 306. Fuzzing can be expensive in terms of, e.g., time, system utilization, etc., and thus, in an embodiment minimum fuzzing is performed during a first, breadth first, search (BFS), on the pages 110 of a web site 105 to efficiently analyze the web site pages 110 for vulnerabilities 135.

In an embodiment minimum fuzzing on a web page 110 involves picking a predetermined small number of input parameters, e.g., one, two, three, etc., for the current web page 110 under test and performing some small amount of fuzzing, e.g., one, two, three, etc., web page 110 input parameter manipulations, attempting to uncover a vulnerability 135 on the current web page 110.

If no vulnerability is uncovered with the minimum fuzzing performed on the current web page under test in an embodiment heuristics are gathered and analyzed for the current web page under test and thereafter utilized to render a determination as to whether the page has the potential for hosting a vulnerability 310.

If the heuristic analysis does not at this time indicate that the current web page under test has the potential for hosting a vulnerability then in an embodiment at decision block 312 a determination is made as to whether the time allotted for the adaptive fuzzing of the web site has been used. In an embodiment a session of adaptive fuzzing is performed on a web site for a predetermined amount of time and is ended 314 when the allotted time is up.

If at decision block 312 the current adaptive fuzzing session allotted time is up then an an embodiment adaptive fuzzing is ended for the web site at this time 314.

If, however, at decision block 312 the current adaptive fuzzing session allotted time has not been used up then in an embodiment a breadth first search (BFS) is continued to determine another page of a web site to test, or otherwise cheek, for vulnerabilities 302. In one aspect of this embodiment the adaptive fuzzing system 150 randomly selects another web page 110 at the current level that has not yet been tested to become the new web page under test 110 if there are any existing web pages 110 at the current level that have not yet been tested. In this aspect of this embodiment if all the web pages 110 at the current level, e.g., level two of the web site 105 of FIG. 2, have already been tested, then the adaptive fuzzing system 150 randomly selects a web page 110 at the next level down, e.g., web page (3,1) 110 at the third level of the web site 105 of FIG. 2, that has not yet been tested to become the new web page under test 110.

In other aspects of this embodiment the adaptive fuzzing system 150 utilizes a predetermined methodology for selecting a web page 110 to become the new web page under test 110, e.g., the adaptive fuzzing system 150 utilizes some ordering of the calls of web pages 110 within the web site 105 to select the web page 110 to become the next web page under test 110, etc.

If at decision block 306 the minimum fuzzing performed on a current web page uncovers a vulnerability then the current web page has one or more issues, i.e., vulnerabilities, 308. Under these circumstances, or when at decision block 310 the current web page under test is determined to have the potential for hosting a vulnerability, in an embodiment a depth first search (DFS) is now utilized to determine the ordering of the pages of a web site to test, or otherwise check, for vulnerabilities 320. In an embodiment a depth first search tests the nodes 110 of a web site 105 in a branch 210 of the web site 105 beginning with a page 110 with an uncovered vulnerability 135 or a page 110 determined to have the potential for a vulnerability 135 and ending with an end node 130 in a branch 210 of the web site 105.

Thus, for example, and referring again to FIG. 2, assume the heuristics for node (2,3) 110 indicate node (2,3) 110 at the second (2) level in the web site 105 has potential for hosting a vulnerability 135. With this assumption in an embodiment utilizing depth first search of the exemplary web site 105 of FIG. 2 the adaptive fuzzing system 150 may test nodes 110 (2,3), (3,6), (4,9) and (5,9) in branch 210. Alternatively, with the assumption that node (2,3) 110 has the potential for hosting a vulnerability 135 the adaptive fuzzing system 150 could in an embodiment test depth first search nodes 110 (2,3), (3,7) and (4,10) in another branch 210 of the web site 105.

In an embodiment the adaptive fuzzing system 150 randomly selects the web pages 110 in a branch 210 to test during a depth first search phase. In alternative embodiments the adaptive fuzzing system 150 utilizes a predetermined methodology for selecting the pages 110 in a branch 210 to test during a depth first search phase, e.g. the adaptive fuzzing system 150 utilizes some ordering of the calls of web pages 110 within the web site 105 to select the ordering of the web pages 110 of a branch 210 to test, etc.

In an embodiment while doing a depth first search to select the ordering of web pages of a web site to test expanded fuzzing is performed on the current web page under test if depth first searching is being performed because the current web page under test has been determined to have the potential for hosting a vulnerability 320. In an embodiment while doing a depth first search to select the ordering of web pages of a web site to test expanded fuzzing is performed on a child node of the current web page under test if depth first searching is being performed because the current web page under test has been found to have a vulnerability 320.

In an embodiment a determination is made as to whether the expanded fuzzing uncovers a vulnerability on the page being tested 322.

At the time when the adaptive fuzzing system 150 has first switched from a breadth first search phase to a depth first search phase to select the ordering of web pages 110 of a web site 105 to test either the current page under test 110 has an identified vulnerability 135 or the page 110 has been identified as having a potential for a vulnerability 135 and thus expanded fuzzing can be effectively utilized at this juncture to attempt to uncover vulnerabilities 135 on the web site's web pages 110. In an aspect of this embodiment an informed assumption is utilized that if a current web page under test 110 has a vulnerability 135 or the potential for a vulnerability 135 then its children nodes 110, i.e., the web pages 110 that are accessed from the current page under test 110, are more likely to host a vulnerability 135.

In an embodiment expanded fuzzing on a web page 110 involves picking a predetermined large number of input parameters, e.g., eight, ten, etc., for the current web page under test 110 and performing some in depth amount of fuzzing, e.g., eight, ten, fifteen, etc., web page 110 input parameter manipulations, attempting to uncover a vulnerability 135 on the current web page 110. In an alternative embodiment expanded fuzzing on a web page 110 involves performing some in depth amount of fuzzing, e.g., web page 110 input parameter manipulations, for a predetermined time, ten minutes, twenty minutes, etc., attempting to uncover a vulnerability 135 on the current web page 110.

During the expanded fuzzing testing of a web page heuristics are gathered and analyzed for the web page 322.

If at decision block 322 the expanded fuzzing performed on the now current web page uncovers a vulnerability then the current web page has one or more issues, i.e., vulnerabilities, 324.

Whether or not the expanded fuzzing on the now current web page under test uncovers a vulnerability in an embodiment at decision block 326 a determination is made as to whether the time allotted for the adaptive fuzzing of the web site has been used. As noted, in an embodiment a session of adaptive fuzzing is performed on a web site for a predetermined amount of time and is ended 314 when the allotted time is up.

If at decision block 326 the current adaptive fuzzing session allotted time is up then in an embodiment adaptive fuzzing is ended for the web site at this time 314.

If, however, at decision block 326 the current adaptive fuzzing session allotted time has not been entirely used then in an embodiment at decision block 328 a determination is made as to whether the depth first search (DFS) on the web site is to be ended. In an embodiment depth first searching to identify the web pages 110 to perform fuzzer testing on in any particular order is ended when the adaptive fuzzing system 150 has checked each child node 110 of a node 110 found to have a vulnerability 135 or a node 110 identified as having the potential for a vulnerability 135.

In an alternative embodiment depth first searching to identify the web pages 110 to perform fuzzer testing on in any particular order is ended when the adaptive fuzzing system 150 has tested an end node 130, e.g., node (5,9) 130, in a web site branch 210.

If at decision block 328 it is determined that the current depth first search phase of the adaptive fuzzing of the web site is to be ended then in an embodiment a new phase of breadth first searching (BFS) is begun to identify the order of the pages of a web site to test, or otherwise check, for vulnerabilities 302.

If at decision block 328 it is determined that the current depth first search phase of the adaptive fuzzing of the web site is to be continued then in an embodiment depth first searching (DRS) is continued to be utilized to identify the order of the pages of a web site to test, or otherwise check; for vulnerabilities 320.

Referring again to HG. 1, in an embodiment the adaptive fuzzing system 150 can be simultaneously hosted on multiple computing devices 600, e.g., multiple client computing devices 125. In this embodiment additional throughput and/or scalability, e.g., concurrent testing of the pages 110 of a web site 105, additional testing outside the time window for adaptive fuzzing system 150 testing performed on one computing device 600, concurrent testing of multiple web sites 105, etc., can be achieved. In this embodiment with this scalability capability multiple adaptive fuzzing systems 150 executing on multiple computing devices 600 can collaborate to check multiple web sites 105 simultaneously and/or to check a single, large, web site 105 concurrently, to effect more efficient and timely testing and review of web site(s) 105. In an aspect of this embodiment a dynamic scalable number of adaptive fizzing systems 150 operating on various computing devices 600 are collaboratively employed at any one time pursuant to one or more current testing environment criteria, e.g., the number of web sites 105 to be tested, the number of web sites 105 to be tested in a predetermined time frame, the number of pages 110 for a web site 105 to be tested, etc.

Figure 4A:
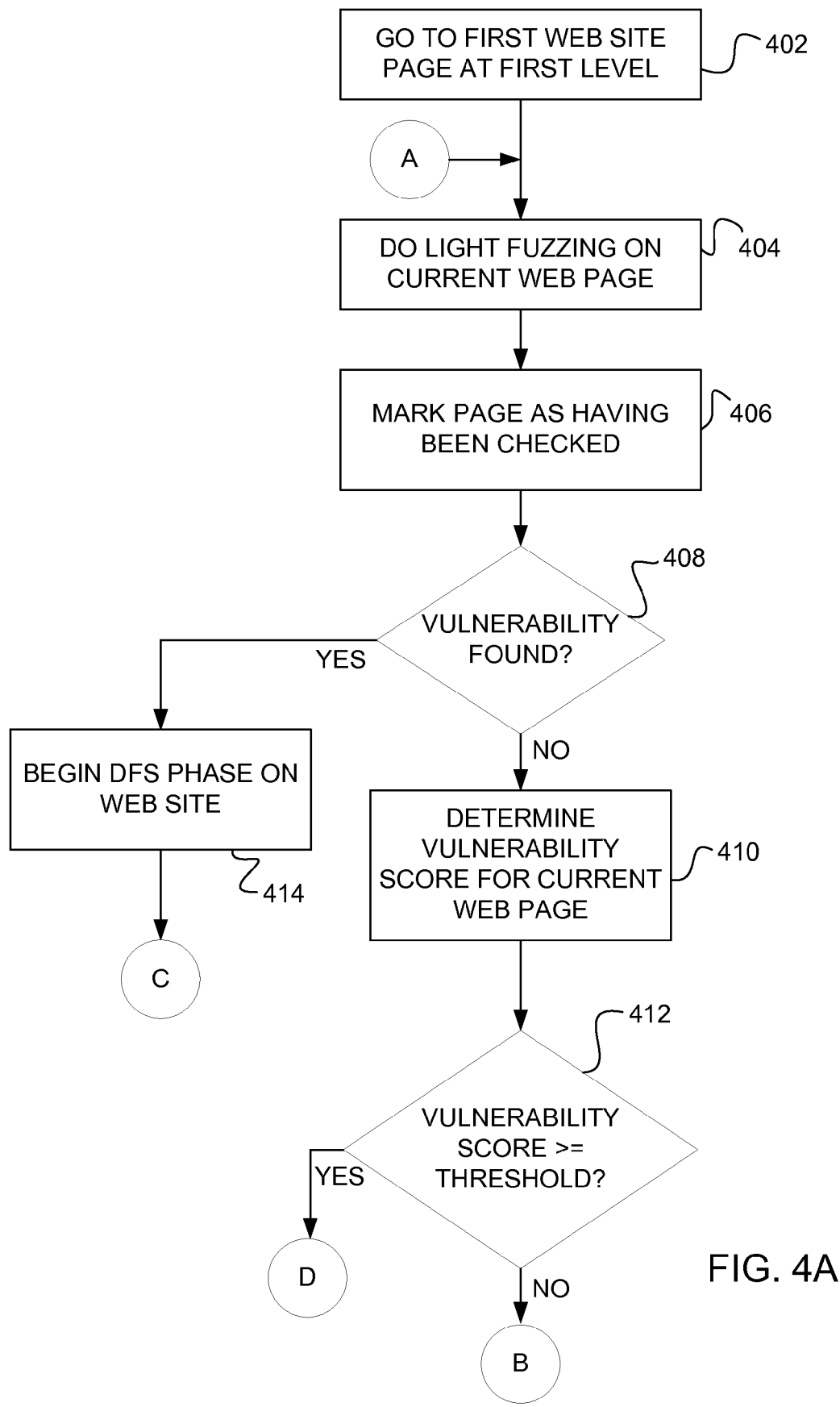
FIGS. 4A-4C depicts an embodiment logic flow for an embodiment fuzzing system.
Figure 4B:
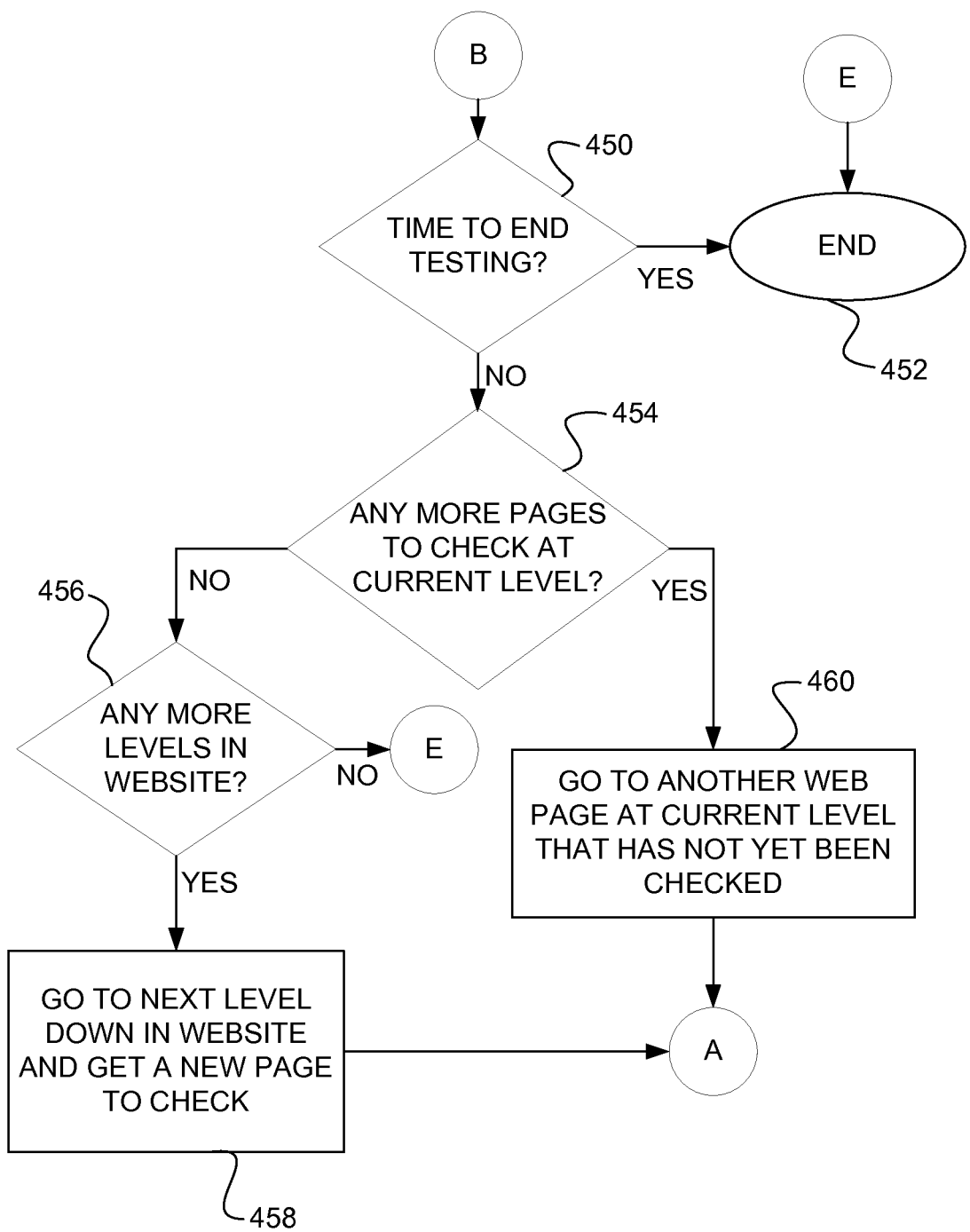
Figure 4C:
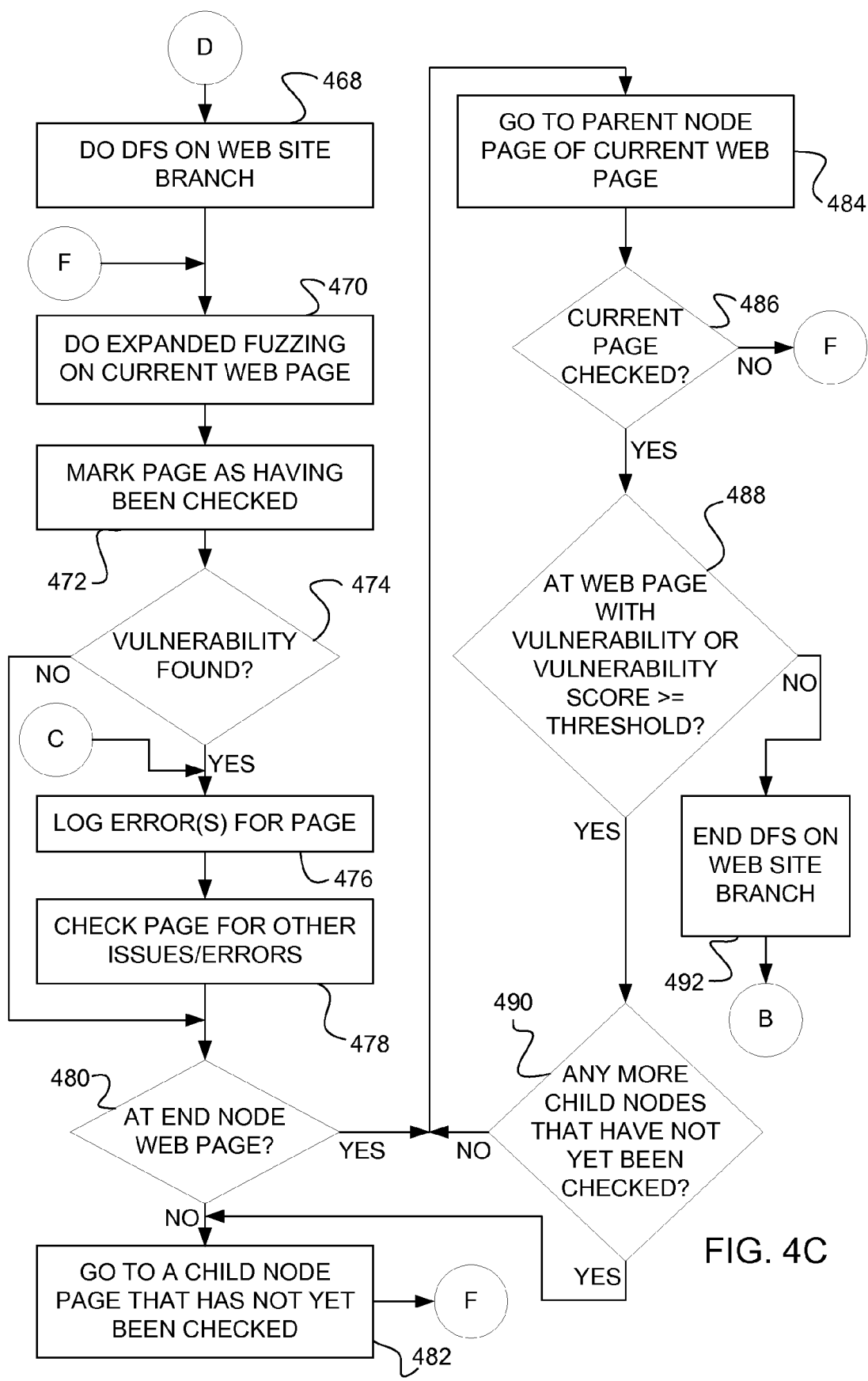

FIGS. 4A-4C illustrate an embodiment logic flow for an embodiment adaptive fuzzing system 150 to be utilized on a web site 105. While the following discussion is made with respect to systems portrayed herein the operations described may be implemented in other systems. The operations described herein are not limited to the order shown. Additionally, in other alternative embodiments more or fewer operations may be performed.

Referring to FIG. 4A in an embodiment during an initial breadth first search (BFS) phase a breadth first search is utilized to determine the order of pages of a web site to test, or otherwise check, for vulnerabilities 402. In an embodiment a first web site page at a first level is identified as the current page under test 402.

In an embodiment minimal, i.e., light, fuzzing is performed on a current web page under test 404. As previously discussed, in an embodiment light fuzzing on a web page 110 involves picking a predetermined small number of input parameters, e.g., one, two, three, etc., for the current web page under test 110 and performing some minimal amount of fuzzing, e.g., one, two, three, etc., web page 110 input parameter manipulations, attempting to uncover a vulnerability 135 on the current web page 110.

In an embodiment the current web page under test is marked, or otherwise identified, as having been checked, or tested, 406. In this embodiment the web pages that are tested are remembered, or otherwise kept track of, and, thus, in an aspect of this embodiment a record is maintained of the pages of the web site that have minimal fuzzing performed on them 406.

In an embodiment at decision block 408 a determination is made as to whether the fuzzing performed on the current web page under test uncovered a vulnerability on the page. If no, in an embodiment a vulnerability score is generated for the current web page under test 410.

In an embodiment a vulnerability score 140 is an indication of the probability, or potential, the current web page 110 has for hosting a vulnerability 135, i.e., a prediction of how likely it is that the current web page under test 110 has an issue 135, i.e., vulnerability 135.

In an embodiment a vulnerability score for a web page is generated using heuristics gathered and/or generated by the adaptive fuzzing system for the web page 410. In an aspect of this embodiment heuristics are gathered and/or generated by the adaptive fuzzing system as part of the fuzzing performed on the web page 404.

Figure 5:
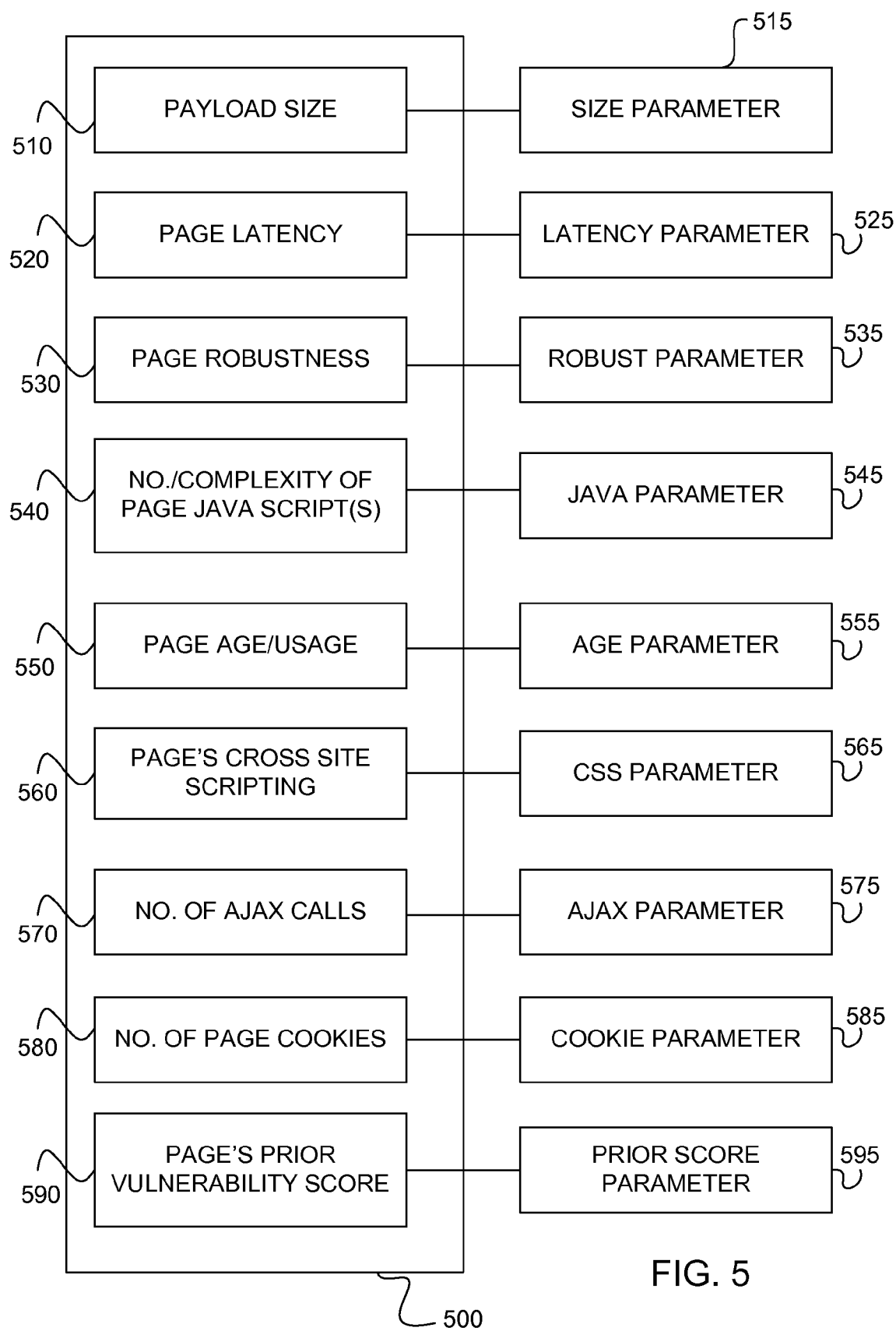
FIG. 5 depicts embodiment heuristics and associated parameters utilized to generate a vulnerability score for a page of a web site.

Referring to FIG. 5, embodiment heuristics 500 that are utilized in generating an embodiment vulnerability score 140 for a web page 110 include the payload size 510 of the current web page under test 110. In an embodiment the payload size 510 of a web page 110 is the amount of code, e.g., HTML, etc., for the page 110. In an aspect of this embodiment the bigger a page's payload size 510 the more likely it is the page 110 hosts a vulnerability 135. In an aspect of this embodiment if a page's payload size 510 is greater than a predetermined number, e.g., greater than three-hundred thousand (300K), then the page's payload size heuristic parameter 515 is assigned a point, e.g., one (1), by the adaptive fuzzing system 150.

In an alternative aspect of this embodiment a page's payload size heuristic parameter 515 is assigned a value between zero (0) and one (1) based on the predetermined range the page's payload size 510 fits within. For example, in this alternative aspect of this embodiment a page's payload size heuristic parameter 515 is assigned a value of zero (0) if the page's payload size 510 is less than thirty thousand (30K). In this example for this alternative aspect of this embodiment the page's payload size heuristic parameter 515 is assigned a value of one-quarter (0.25) if the page's payload size 510 is greater than or equal to thirty thousand (30K) but less than one hundred thousand (100K). In this example for this alternative aspect of this embodiment the page's payload size heuristic parameter 515 is assigned a value of one-half (0.5) if the page's payload size 510 is greater than or equal to one hundred thousand (100K) but less than two-hundred thousand (200K). In this example for this alternative aspect of this embodiment the page's payload size heuristic parameter 515 is assigned a value of three quarters (0.75) if the page's payload size 510 is greater than or equal to two-hundred thousand but less than three-hundred thousand (300K), and is assigned a value of one (1) if the page's payload size 510 is greater than or equal to three-hundred thousand (300K).

In an embodiment the latency 520 of the current web page under test 110 is a heuristic 500 used to generate a vulnerability score 140 for a web page 110. In an embodiment the page latency 520 of a web page 110 is the amount of time it takes for the page 110 to be displayed to a user 180 upon being activated for output to a user 180; e.g., how long it takes for a server 115 to send the page 110 to a client 125 and the client 125 to output the page 110 for display to a user 180. In an aspect of this embodiment the bigger a page's latency 520, i.e., the heavier, or slower, a page 110 is, the more likely it is the page 110 has a vulnerability 135. In an aspect of this embodiment if a page's latency 520 is greater than a predefined time period, e.g., greater than thirty (30) seconds, the page's latency heuristic parameter 525 is assigned a point, e.g., one (1), by the adaptive fuzzing system 150.

In an alternative aspect of this embodiment a page's latency heuristic parameter 525 is assigned a value between zero (0) and one (1) based on the predetermined range the page's latency 520 fits within. For example, in this alternative aspect of this embodiment a page's latency heuristic parameter 525 is assigned a value of zero (0) if the page's latency 520 is less than ten (10) seconds. In this example for this alternative aspect of this embodiment the page's latency heuristic parameter 525 is assigned a value of one-half (0.5) if the page's latency 520 is greater than or equal to ten (10) seconds but less than thirty (30) seconds. In this example for this alternative aspect of this embodiment the page's latency heuristic parameter 525 is assigned a value of one (1) if the page's latency 520 is greater than or equal to thirty (30) seconds.

In an embodiment the robustness 530 of the current web page under test 110 is a heuristic 500 utilized to generate a vulnerability score 140 for a web page 110. In an embodiment the page robustness 530 of a web page 110 is an indication of how unstable, i.e., flaky, the web page 110 is. In an embodiment a value indicative of the page robustness 530 is generated based on results achieved when fuzzing is performed on the web page 110. In an embodiment if a page 110 appears unstable and/or unexpected results occur when fuzzing is performed on the web page 110 then the page's robustness heuristic parameter 535 is assigned a point, e.g., one (1), by the adaptive fuzzing system 150.

Ire an alternative aspect of this embodiment a page's robustness heuristic parameter 535 is assigned a value between zero (0) and one (1) based on the predetermined range the page's robustness 530 fits within, based on results of the fuzzing performed on the web page 110.

In an embodiment the number and complexity of a web page's java scripts 540, also referred to herein as a page's java 540, is a heuristic 500 employed to generate a vulnerability score 140 for the web page 110. In an embodiment a page's Java 540 is a measure of the page's utilization of verbose java scripts, i.e., is based on how many java scripts the web page 110 utilizes, how big one or more of the page's java scripts are, and/or how complex any one or more of the page's java scripts are.

In an embodiment the java scripts of a page under test 110 are reviewed and analyzed by the adaptive fuzzing system 150. In an aspect of this embodiment the more java scripts for a web page 110 and/or the more complex the java scripts of the web page 110 are the more likely it is the page 110 has a vulnerability 135. In an aspect of this embodiment if a page's java 540 is greater than a predetermined number, e.g., a page 110 has more than five (5) java scripts and/or any one (1) java script for a page 110 is greater than ten thousand (10K), then the page's java heuristic parameter 545 is assigned a point, e.g., one (1), by the adaptive fuzzing system 150.

In an alternative aspect of this embodiment a page's java heuristic parameter 545 is assigned a value between zero (0) and one (1) based on the predetermined range the page's java 540 fits within. For example, in this alternative aspect of this embodiment a page's java heuristic parameter 545 is assigned a value of zero (0) if the page 110 has no java scripts. In this example for this alternative aspect of this embodiment the page's java heuristic parameter 545 is assigned a value of one-tenth (0.10) if the page 110 has one (1) or two (2) java scripts and/or any of the page's java scripts are greater than five thousand (5K) but less than ten thousand (10K). In this example for this alternative aspect of this embodiment the page's java heuristic parameter 545 is assigned a value of two-tenths (0.20) if the page 110 has three (3) or four (4) java scripts and/or any of the page's java scripts are greater than or equal to ten thousand (10K) but less than fifteen thousand (15K).

In this example for his alternative aspect of this embodiment the page's java heuristic parameter 545 is assigned a value of three-tenths (0.30) if the page 110 has five (5) or six (6) java scripts and/or any of the page's java scripts are greater than or equal to fifteen thousand (15K) but less than twenty thousand (20K). In this example for this alternative aspect of this embodiment the page's java heuristic parameter 545 is assigned a value of four-tenths (0.40) if the page 110 has seven (7) java scripts and/or any of the page's java scripts are greater than or equal to twenty thousand (20K) but less than twenty-five thousand (25K). In this example for this alternative aspect of this embodiment the page's java heuristic parameter 545 is assigned a value of five-tenths (0.50) if the page 110 has eight (8) java scripts and/or any of the page's java scripts are greater than or equal to twenty-five thousand (25K) but less than thirty thousand (30K).

In this example for this alternative aspect of this embodiment the page's java heuristic parameter 545 is assigned a value of sixth-tenths (0.60) if the page 110 has nine (9) java scripts and/or any of the page's java scripts are greater than or equal to thirty thousand (30K) but less than thirty-five thousand (35K). In this example for this alternative aspect of this embodiment the page's java heuristic parameter 545 is assigned a value of seventh-tenths (0.70) if the page 110 has ten (10) or eleven (11) java scripts and/or any of the page's java scripts are greater than thirty-five thousand (35K) but less than forty thousand (40K). In this example for this alternative aspect of this embodiment the page's java heuristic parameter 545 is assigned a value of eight-tenths (0.80) if the page 110 has at least twelve (12) java scripts but less than sixteen (16) java scripts and/or any of the page's java scripts are greater than or equal to forty thousand (40K) but less than fifty thousand (50K).

In this example for this alternative aspect of this embodiment the page's java heuristic parameter 545 is assigned a value of nine-tenths (0.90) if the page 110 has at least sixteen (16) java scripts but less than twenty-five (25) java scripts and/or any of the page's java scripts are greater than or equal to fifty thousand (50K) but less than sixty-five thousand (65K). In this example for this alternative aspect of this embodiment the page's java heuristic parameter 545 is assigned a value of one (1) if the page 110 has at least twenty-five (25) java scripts and/or any of the page's java scripts are at least sixty-five thousand (65K).

In an embodiment a web page's age and/or usage, also referred to herein as a page's age 550, is a heuristic 500 utilized to generate a vulnerability score 140 for the web page 110. In an embodiment a page's age 550 is an identification of the how old the page 110 is, i.e., how long ago it was developed for use, and/or how often the page 110 is currently being utilized, i.e., accessed, by users 180. In an aspect of this embodiment the older a page 110 is and/or the less a page 110 is utilized the more likely it is the page 110 hosts a vulnerability 135. In an aspect of this embodiment if a page's age 550 is without a predefined band, e.g., the page 110 is older than five (5) years and/or the page 110 is utilized less than once a month, then the page's age heuristic parameter 555 is assigned a point, e.g., one (1), by the adaptive fuzzing system 150.

In an alternative aspect of this embodiment a page's age heuristic parameter 555 is assigned a value between zero (0) and one (1) based on the predetermined range the page's age 550 fits within.

In an embodiment the cross site scripting resilience 560 of the current web page under test 110 is an embodiment heuristic 500. In an embodiment the cross site scripting resilience 560, also referred to herein as css resilience 560, of a web page 110 is an indication of the page's potential for cross site scripting. Cross site scripting is a type of computer security vulnerability that can be found in web pages 110 and which enables attackers to inject client-side script(s) into web pages 110 viewed by other users 180. In an embodiment cross site scripting is when a script, e.g., java script, that is input as a parameter to a web page 110 is subsequently output as part of the HTML (Hyper Text Markup Language) that is executed by the page 110. In other words, in an embodiment cross site scripting refers to the situation where a script that is introduced as a web page parameter ends up being executed on the client 125 accessing the web site 105. In an aspect of this embodiment cross site scripting on a web page 110 signifies that the page 110 may have a vulnerability 135.

In an embodiment cross site scripting resilience 560 for a web page 110 is determined during fuzzing that is performed on the web page 110. In an aspect of this embodiment if a web page 110 exhibits cross site scripting during fuzzing then the page's css resilience heuristic parameter 565 is assigned a point, e.g., one (1), by the adaptive fuzzing system 150.

In an embodiment the Ajax (Asynchronous JavaScript and XML) calls 570 of the current web page under test 110 is an embodiment heuristic 500. Ajax calls 570 are a known mechanism for a page 110 to send information to a server 115 and to get information back from the server 115 without refreshing the page 110. Utilizing Ajax calls 570 a web page 110 can send data to and retrieve data from a server 115 asynchronously, i.e., in the background, without interfering with the display or behavior of the current web page 110 being output to a user 180.

In an embodiment the Ajax calls 570 of a page under test 110 are reviewed by the adaptive fuzzing system 150. In an aspect of this embodiment the more Ajax calls 570 a web page 110 utilizes the more likely it is the page 110 has a vulnerability 135. In an aspect of this embodiment if the number of Ajax calls 560 for a page 110 is greater than a predetermined number, e.g., greater than three (3), then the page's Ajax call heuristic parameter 575 is assigned a point, e.g., one (1), by the adaptive fuzzing system 150.

In an alternative aspect of this embodiment a page's Ajax call heuristic parameter 575 is assigned a value between zero (0) and one (1) based on the predetermined range the number of Ajax calls 570 for the page 110 fits within. For example, in this alternative aspect of this embodiment a page's Ajax call heuristic parameter 575 is assigned a value of zero (0) if the page 110 has no Ajax calls 570. In this example for this alternative aspect of this embodiment the page's Ajax call heuristic parameter 575 is assigned a value of one-quarter (0.25) if the page 110 has between one (1) and three (3) Ajax calls 570. In this example for this alternative aspect of this embodiment the page's Ajax call heuristic parameter 575 is assigned a value of one-half (0.5) if the page 110 has between four (4) and eight (8) Ajax calls 570. In this example for this alternative aspect of this embodiment the page's Ajax call heuristic parameter 575 is assigned a value of three-quarters (0.75) if the page 110 has between nine (9) and fifteen (15) Ajax calls 570, and is assigned a value of one (1) if the page 110 has more than fifteen (15) Ajax calls 570.

In an embodiment the cookies 580 of the current web page under test 110 is an embodiment heuristic 500. Cookies 580 are used for a web page 110 to send information to a user's browser and for the browser to return the information to the web page 110. The information of a cookie 580 can be used for myriad activities, e.g., authentication of a user session, user preferences, shopping cart contents, etc. While cookies 580 cannot be programmed they can be used by cyber attackers to track a user's browsing activities on the world wide web 670, i.e., internet 670, and they can also be stolen to gain access to a user's web account, and thus, represent a potential web page vulnerability 135.

In an embodiment the cookies 580 of a page under test 110 are reviewed by the adaptive fuzzing system 150. In an aspect of this embodiment the more cookies 580 for a web page 110 the more likely it is the page 110 has a vulnerability 135. In an aspect of this embodiment if the number of cookies 580 for a page 110 is greater than a predetermined number, e.g., greater than ten (10), then the page's cookie heuristic parameter 585 is assigned a point, e.g., one (1), by the adaptive fuzzing system 150.

In an alternative aspect of this embodiment a page's cookie heuristic parameter 585 is assigned a value between zero (0) and one (1) based on the predetermined range the number of cookies 580 for the page 110 fits within. For example, in this alternative aspect of this embodiment a page's cookie heuristic parameter 585 is assigned a value of zero (0) if the page 110 has less than three (3) cookies 580. In this example for this alternative aspect of this embodiment the page's cookie heuristic parameter 585 is assigned a value of one-half (0.5) if the page 110 has between four (4) and ten (10) cookies 580 and is assigned a value of one (1) if the page 110 has more than ten (10) cookies 580.

In an embodiment a page's prior vulnerability score 590, if it exists, is an embodiment heuristic 500. In an aspect of this embodiment a page's prior vulnerability score 590, calculated when the page 110 was last analyzed by the adaptive fuzzing system 150, is the prior score parameter 595 used in calculating the page's current vulnerability score 140.

Referring again to FIG. 4A, as noted in an embodiment a vulnerability score is generated for the current web page under test 410. In an aspect of this embodiment the heuristic parameters 515, 525, 535, 545, 555, 565, 575, 585 and 595, if it exists, are input to an evaluation function 170 to generate 410 a current vulnerability score 140. As shown in FIG. 1, in an aspect of this embodiment the evaluation function 170 is a linear evaluation function 172 where $V_I$ is the heuristic parameter value for the $I^{th}$ heuristic parameter, K is equal to nine (9), or eight (8) if there is no currently existing prior vulnerability heuristic parameter 595 for the current page under test 110, and $N_I$ is a predefined weight 173 for the $I^{th}$ heuristic parameter.

In another aspect of this embodiment the evaluation function 170 is an exponential evaluation function 174 for generating 410 a vulnerability score 140 for a web page 110. In this other aspect of the embodiment $V_I$ is the heuristic parameter value for the $I^{th}$ heuristic parameter, K is equal to nine (9), or eight (8) if there is no currently existing prior vulnerability heuristic parameter 595 for the current page under test 110, $N_I$ is a predefined weight 173 for the $I^{th}$ heuristic parameter, and W(I) is a predefined exponential weight 176 for the $I^{th}$ heuristic parameter.

In an embodiment at decision block 412 a determination is made as to whether the current vulnerability score for the web page is greater than or equal to a predetermined threshold value. In an aspect of this embodiment the predetermined threshold value 160 is one-quarter (0.25). In alternative embodiments the predetermined threshold value 160 is alternative values between zero (0) and one (1), e.g., three-tenths (0.3), one-half (0.5), etc. In still other alternative embodiments the predetermined threshold value 160 is alternative values, e.g. two (2), five (5), ten (10), etc.

Referring to FIG. 2 again exemplary vulnerability scores 140 are one tenth (0.1) for node (1,1) 120 at the first web site 105 level, and twelve one-hundreds (0.12) for node (2,1) 110, nineteen one-hundreds (0.19) for node (2,2) 110 and ninety-one one-hundreds (0.91) for node (2,3) 110 all at the second web site 105 level. In the example web site 105 of FIG. 2 node (2,3) 110 has a calculated vulnerability score 140, i.e., ninety-one one hundreds (0.91), that is greater than a predetermined threshold value 160 of one-quarter (0.25), and thus in an embodiment the adaptive fuzzing system 150 at decision block 412 of FIG. 4A will determine to begin a depth first search 468, as further discussed below with reference to FIG. 4C, from a branch 210 beginning with node (2,3) 110; i.e., either via branch 210 containing nodes 110 (2,3), (3,6), (4,9) and (5,9) or, alternatively, branch 210 containing nodes 110 (3,7) and (4,10).

If at decision block 412 the current vulnerability score generated for a web page is not greater than a predetermined threshold value then in an embodiment and referring to FIG. 4B, at decision block 450 a determination is made as to whether it is time to end the current web site adaptive fuzzing testing. In an embodiment adaptive fuzzing testing is performed on the pages 110 of a web site 105 for a predetermined length of time in one session, e.g., for two (2) hours every day, for three (3) hours every other day, etc.

If at decision block 450 it is determined that the allotted time for the current web site adaptive fuzzing testing has been utilized then in an embodiment the current web site adaptive fuzzing testing is ended 452. If, however, at decision block 450 the allotted time for the current web site adaptive fuzzing testing has not yet been entirely utilized then in an embodiment at decision block 454 a determination is made as to whether there are any more web pages for the adaptive fuzzing system to check at the current web site level. If yes, in an embodiment the adaptive fuzzing system identifies another web page at the current level that has not yet been fuzzed during the current adaptive fuzzing system session for the web site to be the current web page under test 460, and, referring back to FIG. 4A, minimal fuzzing is performed on the new current web page under test 404.

if at decision block 454 there are no more web pages for the web site that have yet to be checked during the current adaptive fuzzing system session at the current web site level then in an embodiment at decision block 456 a determination is made as to whether there are any more levels in the web site. If no, in an embodiment all the web pages for the web site have been checked by the adaptive fuzzing system and adaptive fuzzing system testing on the web site is concluded for this session 452.

If however, at decision block 456 it is determined that there is at east one more web site level then in an embodiment the adaptive fuzzing system goes to the next level down in the web site, e.g., goes from level two to level three, goes from level three to level four, etc., and identifies a web page at this new current web site level to be the current web page under test 458. Referring back to FIG. 4A, in an embodiment minimal fuzzing is performed on the new current web page under test 404.

If at decision block 408 of FIG. 4A a vulnerability has been uncovered in the current web page under test during minimal fuzzing on the web page then in an embodiment the adaptive fuzzing system begins a depth first search (DFS) phase and will institute a DFS on a branch of the web site with the current web page under test as the parent node 414. In an embodiment, and referring to FIG. 4C, the uncovered vulnerability(ies), or error(s), are logged, or otherwise reported, for the web page 476. In an embodiment the current web page under test is also validation checked for other issues or errors 478, e.g., to determine if there is a privacy issue with the web page where a user's email address, personal information, etc., is accessible, etc. In an embodiment any additional issues or errors uncovered during the validation check on the current web page under test are also logged, or otherwise reported, 478.

Referring again to FIG. 4A, if at decision block 412 the generated vulnerability score for the current web page under test is greater than a predetermined threshold then in an embodiment the adaptive fuzzing system begins a depth first search (DFS) phase and institutes a DFS on a branch of the web site with the current web page under test as the parent node 468.

In an embodiment the adaptive fuzzing system performs more intense, i.e., heavier, or expanded, fuzzing on the current web page under test if expanded fuzzing is being performed because the current web page under test has been determined to have the potential for hosting a vulnerability 470. In an embodiment the adaptive fuzzing system performs expanded fuzzing on a child node of the current web page under test, wherein the child node becomes the new current web page under test, if expanded fuzzing is being performed because the current, parent, web page under test has been found to have a vulnerability 470.

As previously discussed, in an embodiment expanded fuzzing on a web page 110 involves picking a predetermined large number of input parameters, e.g., eight, ten, etc., for the web page 110 and performing some in depth amount of fuzzing, e.g., eight, ten, fifteen, etc., web page 110 input parameter manipulations, attempting to uncover a vulnerability 135 on the web page 110. In an alternative embodiment expanded fuzzing on a web page 110 involves performing some in depth amount of fuzzing, e.g., web page 110 input parameter manipulations, for a predetermined time, e.g., ten minutes, twenty minutes, etc., attempting to uncover a vulnerability 135 on the web page 110.

Thus, for example, as node (2,3) 110 of exemplary web site 105 of FIG. 2 has a calculated vulnerability score 140 of ninety-one one hundreds (0.91) that is greater than a predetermined threshold value 160 of one-quarter (0.25) in an embodiment at decision block 412 of FIG. 4A the adaptive fuzzing system will determine to begin a depth first search 468 beginning with node (2,3) 110.

In an embodiment the current web page under test is marked, or otherwise identified, as having been checked, or tested, 472. In this embodiment the web pages that are tested are remembered, or otherwise kept track of, and, thus, in an aspect of this embodiment a record is maintained of the pages of the web site that have expanded fuzzing performed on them 472.

In an embodiment at decision block 474 a determination is made as to whether the expanded fuzzing performed on the current web page under test uncovered a vulnerability. If no, in an embodiment a vulnerability score is generated for the current web page under test using heuristics gathered and/or generated by the adaptive fuzzing system for the web page 474. In an aspect of this embodiment heuristics are gathered and/or generated by the adaptive fuzzing system as part of the expanded fuzzing performed on the web page 470.

Alternatively at decision block 474 if the expanded fuzzing performed on the current web page under test uncovered a vulnerability in an embodiment the uncovered vulnerability(ies), or error(s), are logged, or otherwise reported, for the web page 476.

If the current web page under test has at least one identified vulnerability in an embodiment the current web page under test is also validation checked for other issues or errors 478, e.g., to determine if there is a privacy issue with the web page where a user's email address, personal information, etc., is accessible, etc. In an embodiment any additional issues or errors uncovered during the validation check on the current web page under test are also logged, or otherwise reported, 478.

In an embodiment at decision block 480 a determination is made as to whether the adaptive fuzzing system is at an end node for the web site. If no, i.e., the current web page under test has children web pages, then in an embodiment the adaptive fuzzing system identifies a child page of the current web page under test to be the new web page under test 482 and expanded fuzzing is performed on the new current web page under test 470.

For example, and again referring to FIG. 2, at decision block 480 with the current web page under test 110 being node (2,3) 110 a determination is made as to whether node (2,3) 110 is an end node 130. It is not and thus the adaptive fuzzing system 150 will identify a child page, or node, 110 of the current web page (2,3) 110 to be the new web page under test 482, either node 110 (3,6) or (3,7). Expanded fuzzing is then performed on the newly identified current web page under test 470.

If, however, at decision block 480 the current web page under test is an end node, i.e., it has no children web pages, then in an embodiment the adaptive fuzzing system identifies a parent web page of the current web page under test to be the new current web page, i.e., the adaptive fuzzing system goes up a level in the web site, 484.

For example, if the current web page under test 110 is end node (5,9) 130 of FIG. 2 then in an embodiment the adaptive fuzzing system 150 identifies a parent web page 110 of end node (5,9) 130, i.e., page (4,9) 110, to be the new current web page 110. As another example, if the current web page under test 110 is end node (5,2) 130 of FIG. 2 then in an embodiment the adaptive fuzzing system 150 identifies a parent web page 110 of end node (5,2) 130, i.e., either page 110 (4,2) or (4,3), to be the new current web page 110.

In an embodiment at decision block 486 a determination is made as to whether the new current web page 110 has been checked by the adaptive fuzzing system. In an aspect of this embodiment at decision block 486 a determination is made as to whether the new current web page 110 has been checked by the adaptive fuzzing system in the current adaptive fuzzing system session. If no, then in an embodiment the adaptive fuzzing system performs more intense, i.e., expanded, fuzzing on the new current web page 470.

If at decision block 486 the current web page has been checked by the adaptive fuzzing system then in an embodiment at decision block 488 a determination is made as to whether the current web page has been previously determined to have a vulnerability or if it has a vulnerability score that is greater than or equal to a predetermined threshold value. If the current web page either has been determined to have a vulnerability or its vulnerability score is greater than or equal to the predetermined threshold value then in an embodiment at decision block 490 a determination is made as to whether the current web page has any child pages that have not yet been checked by the adaptive fuzzing system during the current testing session. If no, in an embodiment the adaptive fuzzing system selects a parent web page of the current web page to be the new current web page, i.e., the adaptive fuzzing system goes up a level in the web site, 484.

If, however, the current web page has at least one child page that has not yet been checked by the adaptive fuzzing system during the current testing session then in an embodiment the adaptive fuzzing system identifies a child page of the current web page under test to be the new web page under test 482 and expanded fuzzing is performed on the new current web page under test 470.

If at decision block 488 the current web page has not been determined to have a vulnerability and its vulnerability score is less than the predetermined threshold value then in an embodiment the adaptive fuzzing system ends the current DFS phase, i.e., ends depth first searching to identify web pages to test, and reverts to a breadth first searching (BFS) phase in which BES is employed to identify web pages to test 492. In an embodiment and referring again to FIG. 4B at decision block 450 a determination is made as to whether the current adaptive fuzzing system session testing time has been utilized.

If at decision block 474 of FIG. 4C no vulnerability is found on the current web page under test using expanding fuzzing then in an embodiment at decision block 480 a determination is made as to whether the current web page under test is an end node.

Referring again to FIG. 1, in an embodiment the adaptive fuzzing system 150 has a BFS component 190 which manages the breadth first searching within a web site 105, including, e.g., keeping track of, or otherwise maintaining a record of, the pages 110 of a web site 105 that are checked, or otherwise tested. In an embodiment the adaptive fuzzing system 150 has a DFS component 145 which manages the depth first searching within a web site 105, including, e.g., keeping track of, or otherwise maintaining a record of, the pages 110 of a web site 105 that are checked, or otherwise tested.

In an embodiment the adaptive fuzzing system 150 has a minimal fuzzing component 155 that performs minimal fuzzing on web pages 110 of a web site 105. In an embodiment the adaptive fuzzing system 150 has an expanded fuzzing component 165 that performs expanded fuzzing on web pages 110 of a web site 105. In an embodiment the adaptive fuzzing system 150 has a heuristic component 175 that gathers and/or generates relevant heuristics on a web page 110 and generates a vulnerability score 140 for a web page 110.

In an embodiment the adaptive fuzzing system 150 has a scalability component 195 that manages collaborative testing by the adaptive fuzzing system 150 with other adaptive fuzzing systems 150 operating on various other computing devices 600.

In an embodiment the adaptive fuzzing system 150 has an administrative component 185 that manages the functioning of the adaptive fuzzing system 150 on a web site 105, including, but not limited to, handling when to launch the adaptive fuzzing system 150 to check a web site 105, which web site 105 to test at any particular time, when to end an adaptive fuzzing testing session for a web site 105, etc.

In embodiments one or more components of the adaptive fuzzing system 150 can be combined, or alternatively, split into two or more other components. In alternative embodiments differing components can manage adaptive fuzzing testing activities; e.g., in an alternative embodiment the minimal fuzzing component 155 and the expanded fuzzing component 165 keep track of, or otherwise maintain a record of the pages 110 of a web site 105 that are checked, or otherwise tested. In alternative embodiments the adaptive fuzzing system 150 can have more, less and/or alternative components for managing adaptive fuzzing testing on web sites 105.

Computing Device System Configuration

Figure 6:
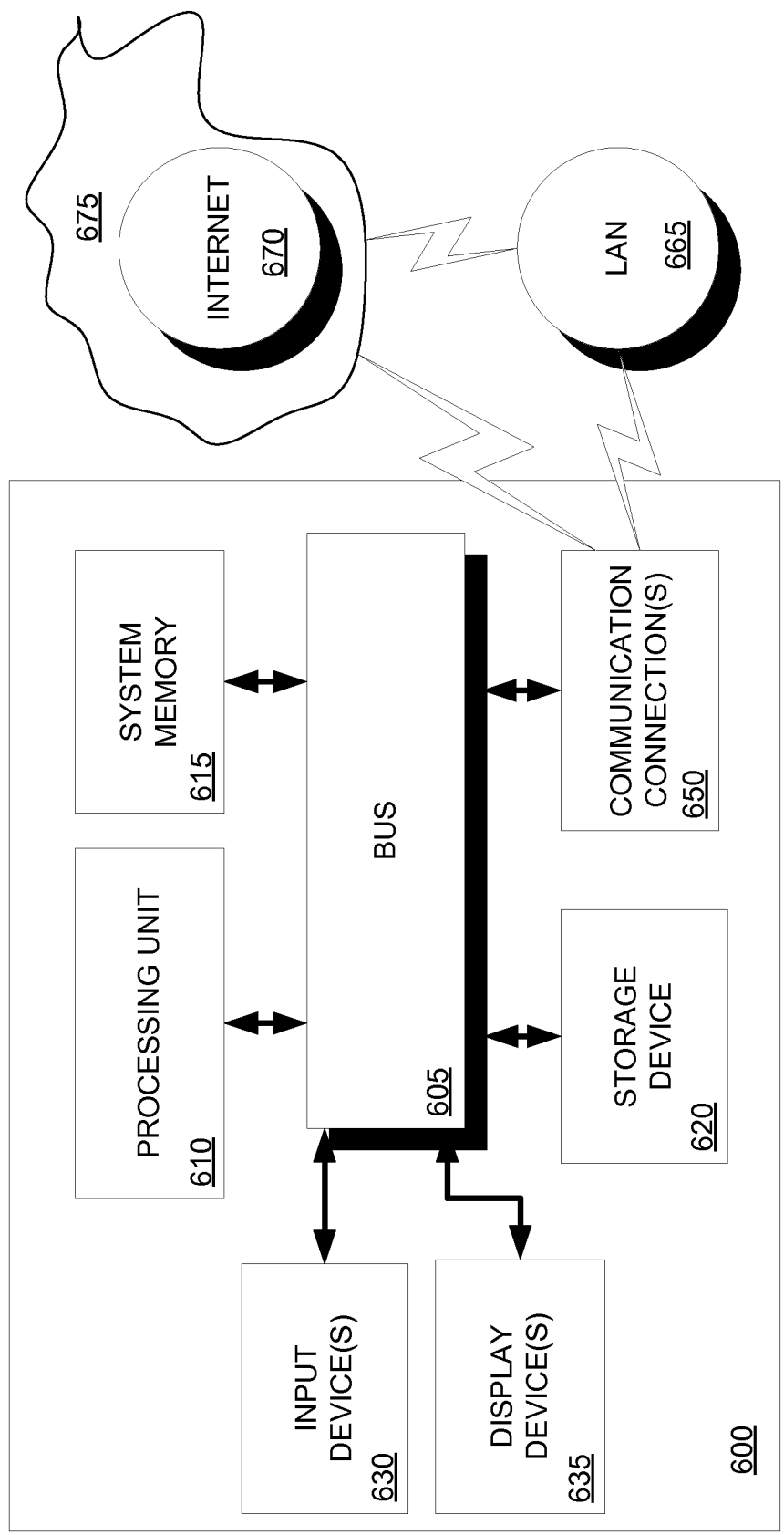
FIG. 6 is a block diagram of an exemplary basic computing device with the capability to process software, i.e., program code, or instructions.

FIG. 6 is a block diagram that illustrates an exemplary computing device system, also referred to herein as a computing device. 600 upon which an embodiment server 115, an embodiment client 125 and an embodiment adaptive fuzzing system 150 can each be implemented, or otherwise supported or enabled. Examples of computing devices 600 include, but are not limited to, computers, e.g., desktop computers, computer laptops, also referred to herein as laptops, notebooks, mainframe computing systems, etc.; etc.

The embodiment computing device 600 includes a bus 605 or other mechanism for communicating information, and a processing unit 610, also referred to herein as a processor 610, coupled with the bus 605 for processing information. The computing device 600 also includes system memory 615, which may be volatile or dynamic, such as random access memory (RAM), non-volatile or static, such as read-only memory (ROM) or flash memory, or some combination of the two. The system memory 615 is coupled to the bus 605 for storing information and instructions to be executed by the processor 610 and may also be used for storing temporary variables or other intermediate information during the execution of instructions by the processor 610. The system memory 615 often contains an operating system and one or more programs, or applications, and/or software code, and may also include program data.

In an embodiment a storage device 620, such as a magnetic or optical disk, solid state drive, flash drive, etc., is also coupled to the bus 605 for storing information, including program code of instructions and/or data. In the embodiment computing device 600 the storage device 620 is computer readable, or machine readable, storage.

Embodiment computing devices 600 generally include one or more display devices 635, such as, but not limited to, a display screen, e.g., a cathode ray tube (CRT) or liquid crystal display (LCD), a printer, and one or more speakers, for providing information to the computing device's users 180. Embodiment computing devices 600 also generally include one or more input devices 630, such as, but not limited to, a keyboard, mouse, trackball, pen, voice input device(s), and touch input devices, which users 180 can utilize to communicate information and command selections to the processor 610. All of these devices are known in the art and need not be discussed at length here.

The processor 610 executes one or more sequences of one or more programs, or applications, and/or software code instructions contained in the system memory 615. These instructions may be read into the system memory 615 from another computing device-readable medium, including, but not limited to, the storage device 620. In alternative embodiments, hard-wired circuitry may be used in place of or in combination with software instructions. Embodiment computing device 600 environments are not limited to any specific combination of hardware circuitry and/or software.

The term "computing device-readable medium" as used herein refers to any medium that can participate in providing program, or application, and/or software instructions to the processor 610 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 615 and storage device 620 of embodiment computing devices 600 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device 600 also includes one or more communication connections 650 coupled to the bus 605. Embodiment communication connection(s) 650 provide a two-way data communication coupling from the computing device 600 to other computing devices 600 on a local area network (LAN) 665 and/or wide area network (WAN), including the world wide web, or internet, 670 and various other communication networks 675, SMS-based networks, telephone system networks, etc. Examples of the communication connection(s) 650 include, but are not limited to, an integrated services digital network (ISDN) card, modem, LAN card, and any device capable of sending and receiving electrical, electromagnetic, optical, acoustic, RF or infrared signals.

Communications received by an embodiment computing device 600 can include program, or application, and/or software instructions and data. Instructions received by the embodiment computing device 600 may be executed by the processor 610 as they are received, and/or stored in the storage device 620 or other non-volatile storage for later execution.

Conclusion

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for adaptive fuzzing testing for web pages of a web site, the method comprising:

executing a breadth first search on a web site to identify a page of the web site to test for a vulnerability;

performing minimal fuzzing testing on the page of the web site that has been identified during a breadth first search;

gathering at least one heuristic for the page of the web site on which minimal fuzzing testing is performed;

generating a vulnerability score for the page of the web site utilizing the at least one heuristic gathered for the page;

utilizing the vulnerability score for the page of the web site to identify the page of the web site as having a potential for a vulnerability;

performing expanded fuzzing testing on the page of the web site that is identified as having the potential vulnerability based upon the vulnerability score that is at least equal to a predetermined vulnerability threshold value; and executing a depth first search on the web site to identify at least one additional page of the web site to test for a vulnerability subsequent to identifying the page on the web site that has the potential vulnerability, wherein the depth first search begins with a page of the web site that is identified as having a potential vulnerability.

2. The method for adaptive fuzzing testing for web pages of a web site of claim 1, further comprising:
utilizing the depth first search to identify pages of the web site in a branch of the web site wherein the branch of the web site comprises the at least one additional page of the web site to test for a vulnerability subsequent to identifying the page on the web site that has the potential vulnerability; and
performing expanded fuzzing testing on at least two pages in the branch of the web site.

3. The method for adaptive fuzzing testing for web pages of a web site of claim 1, wherein the generating a vulnerability score for the page of the web site utilizing at least one heuristic gathered for the page comprises employing a linear evaluation function that utilizes at least a value for one heuristic gathered for the page of the web site to generate the vulnerability score for the page of the web site.

4. The method for adaptive fuzzing testing for web pages of a web site of claim 3, wherein the linear evaluation function weights each value heuristic for the page of the web site utilized to generate the vulnerability score for the page of the web site in generating the vulnerability score for the page of the web site.

5. The method for adaptive fuzzing testing for web pages of a web site of claim 1, wherein the generating a vulnerability score for the page of the web site utilizing at least one heuristic gathered for the page comprises employing an exponential evaluation function that utilizes at least a value for one heuristic gathered for the page of the web site to calculate a vulnerability score for the page of the web site.

6. The method for adaptive fuzzing testing for web pages of a web site of claim 5, wherein the exponential evaluation function utilizes a linear weight for each value of each heuristic for the page of the web site used in generating the vulnerability score for the page of the web site when calculating the vulnerability score for the page of the web site, and wherein the exponential evaluation function further utilizes an exponential weight for each value of each heuristic for the page of the web site used in generating the vulnerability score for the page of the web site when calculating the vulnerability score for the page of the web site.

7. The method for adaptive fuzzing testing for web pages of a web site of claim 1, wherein a heuristic gathered for a page of the web site comprises a payload size of the page of the web site.

8. The method for adaptive fuzzing testing for web pages of a web site of claim 1, further comprising performing adaptive fuzzing testing for web pages of the web site on a first computing device collaboratively with performing adaptive fuzzing testing for web pages of the web site on at least a second computing device.

9. The method for adaptive fuzzing testing for web pages of a web site of claim 1, further comprising:
utilizing the depth first search to identify pages of the web site in a branch of the web site wherein the branch of the web site comprises the at least one additional page of the web site to test for a vulnerability subsequent to identifying the page on the web site that has the potential vulnerability and wherein the branch of the web site further comprises an end node;
performing expanded fuzzing testing on each page in the branch of the web site;
maintaining a record of the pages of the web site that have minimal fuzzing testing performed on them; and
maintaining a record of the pages of the web site that have expanded fuzzing testing performed on them.

10. The method for adaptive fuzzing testing for web pages of a web site of claim 9, further comprising:
recording each error discovered on a page of the web site when expanded fuzzing testing is performed on the page of the web site; and
checking the page of the web site on which an error was discovered when expanded fuzzing testing was performed on the page of the web site for at least one other issue that may be present with the page of the web site.

11. The method for adaptive fuzzing testing for web pages of a web site of claim 9, further comprising:
utilizing the depth first search to identify pages of the web site in each branch of the web site that can be accessed by a user of the web site when the user has accessed the at least one additional page on the web site that has a potential vulnerability;
performing expanded fuzzing testing on each page of the web site in each branch of the web site that can be accessed by the user of the web site when the user has accessed the at least one additional page on the web site that has a potential vulnerability;
ending the depth first search to identify pages of the web site in each branch of the web site that can be accessed by the user of the web site when the user has accessed the at least one additional page on the web site that has a potential vulnerability subsequent to expanded fuzzing testing being performed on each page of the web site in each branch of the web site that can be accessed by a user of the web site when the user has accessed the at least one additional page on the web site that has a potential vulnerability;
executing a second breadth first search on the web site to identify at least one page of the web site to test for a vulnerability that has not been recorded as having minimal fuzzing testing performed on it and has not been recorded as having expanded fuzzing testing performed on it; and
performing minimal fuzzing testing on each page of the web site that is identified during the second breadth first search on the web site.

12. A method for adaptive fuzzing testing for identifying vulnerabilities on a web site, the method comprising:
performing a breadth first search on the web site to identify at least one page of the web site to test for a vulnerability;
performing minimal fuzzing testing on each page of the web site that is identified during the breadth first search;
gathering at least one heuristic for a page of the web site on which minimal fuzzing testing is performed;
generating a vulnerability score for a page of the web site utilizing the at least one heuristic gathered for the page wherein generating the vulnerability score comprises employing a linear evaluation function or an exponential evaluation function that uses at least a value for one heuristic gathered for the page of the web site to calculate the vulnerability score for the page of the web site;
identifying a page of the web site that has a generated vulnerability score that is not less than a predefined vulnerability threshold value wherein an identified page of the web site that has a generated vulnerability score that is not less than the predefined vulnerability threshold value comprises a potentially vulnerable page;

performing expanded fuzzing testing on the potentially vulnerable page; and performing a depth first search on the web site to identify at least one page of the web site to test for a vulnerability subsequent to identifying the potentially vulnerable page, wherein the depth first search begins with the potentially vulnerable page.

13. The method for adaptive fuzzing testing for identifying vulnerabilities on a web site of claim 12, wherein a first heuristic gathered for a page of the web site comprises a payload size of the page of the web site and a second heuristic gathered for a page of the web site comprises a cross site scripting resilience of the page of the web site.

14. An adaptive fuzzing system for web services, comprising:

a breath first search component with circuitry comprising a capability to manage breadth first searching of pages of a web site to identify at least one page of the web site to test for a vulnerability;

a minimal fuzzing component with circuitry comprising a capability to execute minimal fuzzing testing on pages of the web site;

a depth first search component with circuitry comprising a capability to manage depth first searching of pages of the web site to identify at least one additional page of the web site to test for a vulnerability;

an expanded fuzzing component with circuitry comprising a capability to execute expanded fuzzing testing on pages of a web site;

a heuristic component with circuitry that comprises a capability to review pages of the web site and gather at least one heuristic on a page of the web site whose value can be utilized to determine if the page of the web site has a potential for hosting a vulnerability; and a scalability component with circuitry comprising a capability to collaborate with a second adaptive fuzzing system executing on a second computing device to test pages of the web site for vulnerabilities wherein the heuristic component further comprises a capability to generate at least one second heuristic for a page of the web site whose value can be utilized to determine if the page of the web site has the potential for hosting a vulnerability, and wherein the heuristic component further comprises a capability to generate a vulnerability score for a page of the web site using a value for at least one heuristic gathered for the page of the web site and a value for the at least one second heuristic generated for the page of the web site, wherein the vulnerability score generated for the page of the web site that is not less than a predetermined vulnerability threshold value indicated that the page of the web site has the potential for hosting a vulnerability.

* * * * *